US012070150B2

(12) United States Patent
Mori et al.

(10) Patent No.: US 12,070,150 B2
(45) Date of Patent: Aug. 27, 2024

(54) EASILY INSERTABLE CUP SUPPORT

(71) Applicant: SOCIETE DES PRODUITS NESTLE S.A., Vevey (CH)

(72) Inventors: Peter Mori, Gummenen (CH); Alain Teklits, Corsier (CH)

(73) Assignee: Societe des Produits Nestle S.A., Vevey (CH)

( * ) Notice: Subject to any disclaimer, the term of this patent is extended or adjusted under 35 U.S.C. 154(b) by 858 days.

(21) Appl. No.: 17/266,199

(22) PCT Filed: Aug. 8, 2019

(86) PCT No.: PCT/EP2019/071324
§ 371 (c)(1),
(2) Date: Feb. 5, 2021

(87) PCT Pub. No.: WO2020/030740
PCT Pub. Date: Feb. 13, 2020

(65) Prior Publication Data
US 2021/0251419 A1 Aug. 19, 2021

(30) Foreign Application Priority Data
Aug. 9, 2018 (EP) ..................................... 18188315

(51) Int. Cl.
*A47J 31/44* (2006.01)
*A47J 31/40* (2006.01)
*A47J 31/46* (2006.01)

(52) U.S. Cl.
CPC ......... *A47J 31/4428* (2013.01); *A47J 31/407* (2013.01); *A47J 31/4482* (2013.01); *A47J 31/46* (2013.01)

(58) Field of Classification Search
CPC .. A47J 31/4428; A47J 31/407; A47J 31/4482; A47J 31/46
(Continued)

(56) References Cited

U.S. PATENT DOCUMENTS

2015/0164266 A1* 6/2015 Cahen ................. A47J 31/4428
99/290
2016/0255992 A1* 9/2016 Miller ................. A47J 31/4428
(Continued)

FOREIGN PATENT DOCUMENTS

CN 101330855 A 12/2008
CN 102038432 A 5/2011
(Continued)

OTHER PUBLICATIONS

Chinese Office Action for Appl No. 201980047132.0 dated Jul. 8, 2022.
(Continued)

*Primary Examiner* — Omar Flores Sanchez
(74) *Attorney, Agent, or Firm* — K&L Gates LLP

(57) ABSTRACT

A machine (1) for dispensing a beverage (2) includes: a beverage outlet (3) that is located above a dispensing area (4); a machine body or frame (5) having a first connecting part (51) and bearing the beverage outlet (3); and a recipient support (6) having a second connecting part (61) and a support member (62) held by the second connecting part (61). The second connecting part (61) is disconnectably connectable to the first connecting part (51) so that the support member (62) extends into the dispensing area (4) to support a beverage user-recipient (7) under the beverage outlet (3). The first connecting part (51) and the second connecting part (61) have a connection member and a connection receiver arrangement for disconnectably connecting the parts (51,61) such that: the first connecting part forms a connection member and the second connecting part forms a connection receiver; and/or the first connecting part (51) forms a connection receiver and the second connecting part (61) forms a connection member. The connection member is inserted in the connection receiver when the first and second connecting parts (51,61) are connected. The connec-
(Continued)

tion member is removed from the connection receiver along a removal direction (51') when the first and second connecting parts (51,61) are disconnected. The removal direction (51') has an upwardly directed vertical component (51") when such machine (1) is in position to dispense the beverage (2).

17 Claims, 1 Drawing Sheet

(58) Field of Classification Search
 USPC .......................................................... 99/295
 See application file for complete search history.

(56) References Cited

U.S. PATENT DOCUMENTS

| | | | | |
|---|---|---|---|---|
| 2017/0303730 | A1* | 10/2017 | Shi | A47J 31/3695 |
| 2018/0263407 | A1* | 9/2018 | Dovat | A47J 31/3695 |
| 2020/0237136 | A1* | 7/2020 | Keller | A47J 31/4482 |

FOREIGN PATENT DOCUMENTS

| | | |
|---|---|---|
| CN | 103156493 A | 6/2013 |
| CN | 103298383 A | 9/2013 |
| DE | 102013010110 | 12/2014 |
| EP | 1462040 B1 | 9/2007 |
| EP | 3213662 | 9/2017 |
| JP | 2011167469 A | 9/2011 |
| JP | 2013529121 A | 7/2013 |
| JP | 2015502216 A | 1/2015 |
| WO | 2010031665 | 3/2010 |

OTHER PUBLICATIONS

Japanese Office Action for Appl No. 2021-505960 dated Jun. 6, 2023.

* cited by examiner

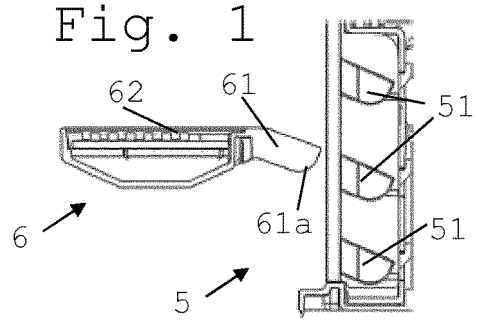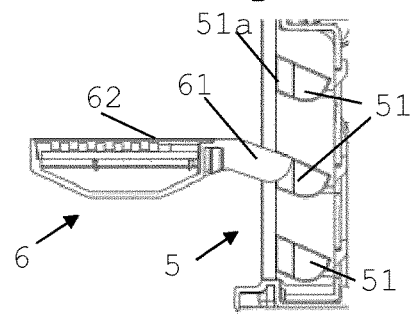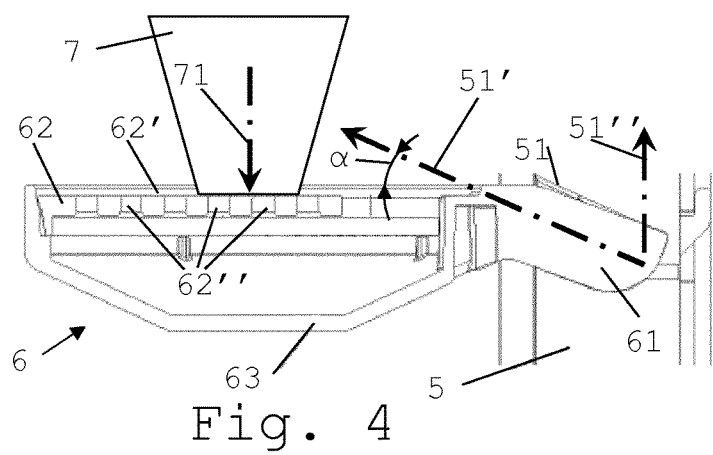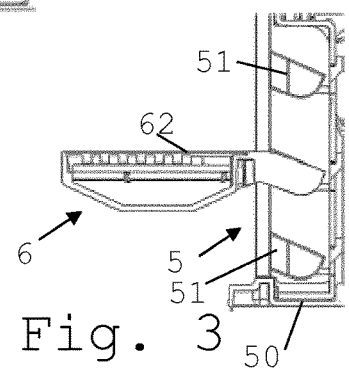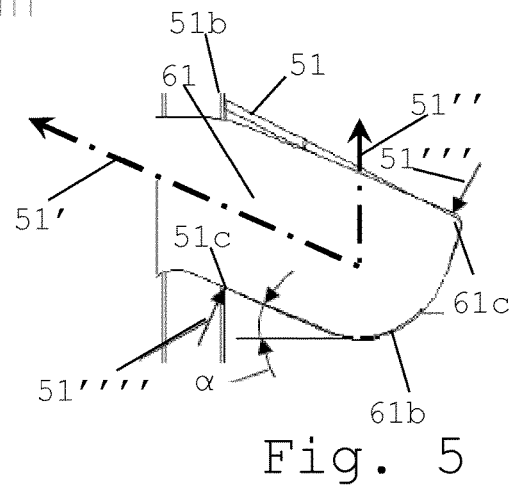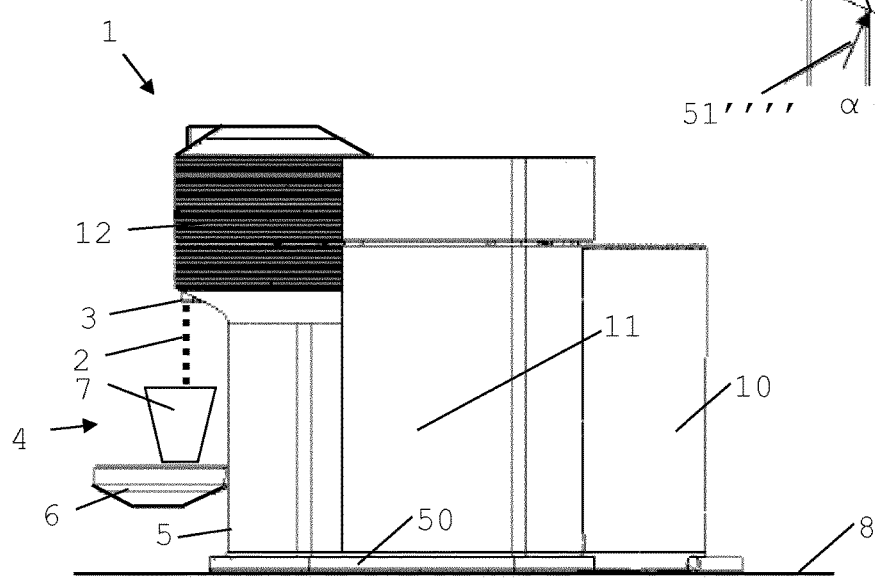

EASILY INSERTABLE CUP SUPPORT

CROSS REFERENCE TO RELATED APPLICATIONS

The present application is a National Stage of International Application No. PCT/EP2019/071324, filed on Aug. 8, 2019, which claims priority to European Patent Application No. 18188315.8, filed on Aug. 9, 2018, the entire contents of which are being incorporated herein by reference.

FIELD OF THE INVENTION

The field of the invention pertains to beverage dispensing machines having a beverage outlet, a service unit and a movable cup support. For instance, the beverage preparation machine uses receptacles of an ingredient of the beverage to be prepared, in particular to machine is arranged to prepare the beverage by circulation of a liquid into the ingredient receptacle and centrifugation thereof, typically to brew the beverage in the ingredient receptacle and extract the beverage therefrom.

For the purpose of the present description, a "beverage" is meant to include any human-consumable liquid substance, such as tea, coffee, hot or cold chocolate, milk, soup, baby food, etc. . . . . A "receptacle" is meant to include any container such as a packaging for containing a pre-portioned beverage ingredient, e.g. a flavouring ingredient, the packaging forming an enclosure, e.g. a capsule, of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Examples of fluid circuits are disclosed in U.S. Pat. Nos. 2,715,868, 5,392,694, 5,943,472, 5,992,298, 6,554,588, WO 2006/032599, WO 2009/024500, WO 2009/150030 and WO 2010/006953.

Usually, the beverage outlet is located above a grid for supporting a cup or other recipient under the outlet and for the passage of possible drops from the beverage outlet or other spills into a collector tray located under the grid. Examples of such machines are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2016/096705, WO 2012/007313, WO 2013/186339, WO 2016/096706, WO 2016/096707, WO 2016/156364, WO 2016/156367 and WO 2016/156368.

SUMMARY OF THE INVENTION

An object of the invention is to provide a solution encountered with prior art configurations or at least an alternative to the prior art configurations.

A preferred object of the invention is to provide a beverage dispensing machine with an ergonomic cup support.

Another preferred object of the invention is to provide a beverage dispensing machine with a cup support that can be assembled and disassembled from a machine's counterpart in a simple manner.

A further preferred object of the invention is to provide a beverage dispensing machine with a cup support that can be easily manufactured.

One or more of this objects can be achieved by a machine in accordance with claim 1.

The invention thus relates to a machine for dispensing a beverage, such as a beverage prepared from a receptacle containing a beverage ingredient, as defined in claim 1.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, e.g. in a concentrate form. A carrier or dilution liquid, e.g. water, may be mixed with such ingredient to form the beverage.

For instance, a predetermined amount of beverage is formed and dispensed on user-request, which corresponds to a serving. The volume of such a serving may be in the range of 25 to 200 ml or up to 300 or 400 ml, e.g. the volume for filling a cup or mug, depending on the type of beverage. Formed and dispensed beverages may be selected from ristrettos, espressos, lungos, cappuccinos, café latte, americano coffees, teas, etc. . . . . A coffee machine may be configured for dispensing espressos, e.g. an adjustable volume of 20 to 60 ml per serving, and/or for dispensing lungos, e.g. a volume in the range of 70 to 150 ml per serving.

The machine includes: a beverage outlet that is located above a dispensing area; a machine body or frame having a first connecting part and bearing the beverage outlet; and recipient a support having a second connecting part and a support member held, directly or indirectly, by the second connecting part.

Typically, the machine includes an external housing having an external front face. The housing may have at least one of: one or more external lateral side faces; an external rear face; an external top face; and an external bottom face. The beverage outlet may be located on the external front face.

Suitable advanced beverage outlet configurations, that include drop management arrangements, are for instance disclosed in WO 2006/050769, WO 2012/072758, WO 2013/127907, EP2014186738.2, EP2014195048.5, EP14195067.5, EP2017208722.3, EP2017208727.2 and EP2017208731.4. For the purpose of implementing the present invention, such drop management is optional. For instance, a simple machine outlet of the type disclosed in U.S. Pat. No. 8,091,469 or WO 2009/074550 can be used.

The second part connecting is disconnectably connectable to the first connecting part so that the support member extends into the dispensing area to support a beverage user-recipient, e.g. a cup or a mug, under the beverage outlet.

The first connecting part and the second connecting part have a connection member and a connection receiver arrangement, e.g. a plug and socket arrangement, for disconnectably connecting the parts such that: the first connecting part forms a connection member and the second connecting part forms a connection receiver; and/or the first connecting part forms a connection receiver and the second connecting part forms a connection member.

The first connecting part may include one or more connection receivers, the second connecting part including a corresponding number of matching connection members.

The second connecting part may include one or more connection receivers, the first connecting part including a corresponding number of matching connection members.

The first connecting part may include a combination of connection member (s) and receiver (s), the second connecting part including a corresponding combination of matching connection receiver (s) and member (s).

The connection member are inserted in the connection receiver when the first and second connecting parts are connected, the connection member being removed from the connection receiver along a removal direction when the first and second connecting parts are disconnected.

Typically, the connection member projects into the connection receiver when the first and second connecting parts are connected.

The removal direction has an upwardly directed vertical component when such machine is in position to dispense said beverage. Typically, in such a position, the machine is placed with a machine bottom on an external generally horizontal support surface.

Hence, the recipient support can be automatically secured to the machine body or frame by gravity (under its own weight) and even further secured by the effect of the weight of a beverage user-recipient on the recipient support. Such a can configuration be beneficial, particularly during beverage preparation, if the machine vibrates so as to prevent or inhibit undesired disconnection of the recipient support from the machine body or frame due to vibrations.

To further secure the connection member in the connection receiver, the connecting parts may be magnetically constrained in the connected state. For instance, the connecting parts are fitted with a pair of magnetic field-generating elements, or with a magnetic field-generating element and a ferromagnetic element.

The magnetic field-generating element can have an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

The ferromagnetic element may be made of at least one of Co, Fe, $Fe_2O_3$, $FeOFe_2O_3$, $NiOFe_2O_3$, $CuOFe_2O_3$, $MgO$ $Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

The upwardly directed vertical component of the removal direction can be opposite to a vertical component of a force exercised by the beverage user-recipient on the support member when placed thereon under the beverage outlet.

The connection member can be in the shape generally of a rod or a bar extending along the removal direction when the first and second connecting parts are connected. The connection receiver may have a corresponding shape such that the connection member can be slid in an out of the connection receiver.

The connection receiver and/or the connection member can have a connection approaching extremity, such as an insertion aperture of the connection receiver or a free end of the connection member, that allows for a mechanical positioning play between the connection member and the connection receiver when approaching each other at insertion. For instance the approaching extremity is tapered or flared, e.g. rounded or bevelled, to facilitate insertion (e.g. by allowing self-positioning) of the connection member into the connection receiver. The receiver connection approaching extremity may be flared and the member connection approaching extremity may be tapered.

The connection approaching extremity can be asymmetric to provide a mechanical positioning play only on an extremity play portion generally opposite to an extremity urging portion against which a main urging force is exercised by the first connecting part on the second connecting part when the second connecting part is connected to the first connecting part. The first connecting part may exercise a first main urging force at the connection approaching extremity and a second main urging force at an extremity opposite thereto.

The connection member and the connection receiver can be secured in a cantilever manner by gravity force of the support member when such machine is in position to dispense the beverage: a or the above free end of the connection member in the connection receiver can be urged down by the connection receiver and a or the insertion aperture of the connection receiver can urge up a or the above extremity in the connection receiver of the connection member opposite the free end. Such urging of the connection member at spaced apart positions of the connection member by the support member under the effect of gravity can be used to secure the connection member in the connection receiver. The greater the force that is exercised on the connection support, the more the connection member may be secured. Such increase of force may typically be achieved by increasing the weight of the support member or by placing weight (e.g. a beverage user-recipient) on the support member.

The free end and the extremity of the connection member opposite the free end can be further urged by gravity force of the beverage user-recipient placed on the support member.

The connection receiver and/or the connection member can have a or the above connection approaching extremity, such as a or the above insertion aperture of the connection receiver or a or the above free end of the connection member, that allows for a mechanical positioning play between the connection member and the connection at receiver insertion. The approaching extremity can be tapered or flared, e.g. rounded or bevelled, to facilitate insertion of the connection member into the connection receiver. For instance, the receiver connection approaching extremity is flared and the member connection approaching extremity is tapered.

In vertical cross-section along extending the removal direction, the connection member within the connection receiver can have a convex shape and/or the connection receiver around the connection member can have a concave shape. The connection member and the connection receiver can be connectable together by a hook-free connection.

The connection member may have a shape extending all along within the connection receiver generally straight or arched along the removal direction when the first and second connecting parts are connected. The connection receiver may have a corresponding shape.

The connection member can be inserted into the connection receiver without change of direction or at least without any abrupt change of direction, i.e. inserted at a straight or moderately curved direction, e.g. with a radius of at least 2 cm, such as in the range of 2.5 to 100 cm, for instance 3 to 50 cm, for example 4 to 25 cm or 5 to 15 cm.

The connection member and connection receiver may be configured such that no abrupt change of direction is expected from a user connecting or disconnecting the first and second connecting parts. For instance, no exclusively rotational movement centred on any of the connecting parts is expected from a user connecting or disconnecting the first and second connection parts.

The connection member and the connection receiver may cooperate along a plain or roller bearing interface to connect and disconnect the member and the receiver.

The connection member and the connection receiver may be clamped together when the first and second parts are connected together.

The support member can have a recipient placement surface for placing the recipient thereon under the beverage outlet and the removal direction can be angled away upwardly from a horizontal direction by an angle in a range of 5 to 80 deg. such as 10 to 60 deg., for instance 15 to 45 deg., e.g. 25 to 35 deg., when the first and second connecting parts are connected and such machine is in position to dispense the beverage.

The machine body or frame may have a plurality of first connecting parts that are vertically spaced apart for allowing the recipient support to be connected via its second connection part selectively at different corresponding heights under the beverage outlet. For example, the recipient support is placed closely under the beverage outlet for supporting short cups under the beverage outlet or is placed remotely under the beverage outlet for supporting high cups under the beverage outlet.

The machine may have a foot configured for placing a mug under the beverage outlet when the recipient support is not connected to the machine body or frame. For instance, the mug is placed in front of the machine's foot under the beverage outlet or the mug is placed on a static machine platform forming a foot under the beverage outlet.

The recipient support may have a drop collection arrangement for collecting drops from the support member.

The collecting arrangement may form a liquid reservoir for accumulating drops or a drain channel for evacuating drops e.g. to a service unit of such machine.

The collecting arrangement can form a member that is separable from the support member or that is integral with the support member.

The collecting arrangement may form a member that is integral with the second connecting part.

The collecting arrangement can be configured to collect drops draining via openings of the support member.

The machine may include a control unit, such as a unit comprising a user-interface, for controlling active machine parts, such as the machine parts for preparing the beverage, e.g. a pump and/or a thermal conditioner. The control unit may be connected to one or more sensors for sensing at least one characteristic selected from characteristics of fluid system, the heater and/or cooler, the pump, a liquid tank, an ingredient collector, a flow of the liquid (e.g. by a flowmeter), a pressure of the liquid and a temperature of the liquid.

The user-interface, when present, may be used for setting at least one parameter relating to beverage preparation, power management and machine servicing. Such beverage preparation relate the parameters may to beverage volumes, beverage temperatures as well as such beverages made of preparation sequences, as different phases such as more or less separate coffee and milk phases, e.g. cappuccinos and latte machiattos. The user-interface may be of the type disclosed in WO 2015/096998.

The machine can ingredient supply have an arrangement, such as a liquid source, e.g. a water tank and/or a connector to a water supply line.

The source may be liquid reservoir. Further details on suitable reservoirs are for example disclosed in WO2007/135136, WO 2010/128109, WO 2011/083103, WO 2011/089210 and EP 2 228 633.

The machine may be directly connected to a water supply line, e.g. as disclosed in WO 2016/005349, WO 2016/005350, WO 2016/005348 and WO 2016/005351.

The machine may have a waste material collector, such as a waste ingredient collector and/or a waste ingredient receptacle collector. The machine body or frame may have a seat for removably receiving the waste material collector.

Examples of collectors are disclosed in disclosed in EP 1 731 065, EP 1 867 260, WO 2009/013778, WO 2009/074559, WO 2009/135869, WO 2010/128109, WO 2011/086087, WO 2011/086088 and EP2018156589.6.

The machine can have a fluid circuit, such as a circuit for guiding a fluid, e.g. water, from a liquid source to the beverage outlet. Examples of fluid circuits are disclosed in WO 2009/074550 and WO 2009/130099.

The fluid circuit may include one or more of:
a thermal conditioner, e.g. a heater and/or a cooler, e.g. in-line heater and/or cooler for thermally conditioning a flow of liquid circulated to the beverage outlet or a batch heater and/or cooler for circulating thermally conditioned liquid from the batch heater and/or cooler to the beverage outlet;
a pump, e.g. a solenoid pump or a membrane pump or a peristaltic pump, such as a low pressure pump e.g. operating within a range of 1 to 5 bar, such as 1.5 to 3 bar; and
an ingredient mixing unit for producing the beverage and delivering such beverage to the beverage outlet.

Such ingredient mixing unit can be arranged for mixing liquid from the source with a flavouring ingredient, e.g. a flavouring ingredient supplied within the receptacle into the mixing unit, such as a unit for mixing the liquid with the flavouring ingredient by rotational forces, for example by rotating the mixing unit when containing the liquid and the flavouring ingredient.

Examples of fluid circuit including a thermal conditioner and/or a pump are disclosed in EP 1 253 844, EP 1 380 243 and EP 1 809 151, WO 2009/074550, WO 2009/130099, WO 2009/150030, WO 2010/108700, WO 2011/107574 and WO 2013/098173.

When the machine is configured to process ingredient receptacles, such receptacles may have a body containing an ingredient and a peripherally projecting flange, e.g. a body in the shape of a cup and a lid covering the mouth of the cup and extending beyond the mouth to form the peripherally projecting flange. For instance, the machine is configured to prepare a beverage by circulating a liquid into such receptacle and centrifugally driving such receptacle.

The receptacle may be held in the ingredient mixing unit by a holder, e.g. of the above ingredient mixing unit. The ingredient mixing unit may be of a centrifugal type, e.g. as disclosed in EP 2 000 062, EP 2 155 020, EP 2 152 128, WO 2008/148646, WO 2009/106175, WO 2009/106589, WO 2010/026045, WO 2010/026053, WO 2010/066736, WO 2008/148650, WO 2008/148834, WO 2010/066705, WO 2010/063644, WO 2011/023711, WO 2017/046294 and WO 2017/202746.

For instance, the machine incorporates one or more of the features disclosed in WO 2014/096122 or WO 2014/096123.

Moreover, the receptacle holder is typically associated with a beverage collection and dispensing system, e.g. as disclosed in WO 2009/106175 and WO 2010/089329.

The beverage preparation machine can be an in-home or out of home machine. The machine may be a coffee, tea, chocolate, cacao, milk, soup, baby food, etc. ... preparation machine. The machine may be arranged for preparing within a or the above ingredient mixing unit, a beverage by passing hot or cold water or another liquid through a receptacle containing an ingredient, such as a flavoring ingredient, of the beverage to be prepared, such as ground coffee or tea or chocolate or cacao or milk powder.

In the context of the present disclosure, the relative orientation of the machine, e.g. references to the machine's top, front, bottom, side, rear, etc., unless specified otherwise, typically relate to the orientation of operation of the machine, e.g. on top of a table, with the machine's outlet in front of a user for naturally operating the machine to dispense a beverage.

BRIEF DESCRIPTION OF THE DRAWINGS

The invention will now be described with reference to the schematic drawings, wherein:

FIGS. 1 to 3 illustrate a connection sequence of a machine body or frame with a first connection part and a recipient support with a second connection part of a machine according to the invention;

FIG. 4 illustrates in greater details the recipient support connected to the machine body or frame in the state shown in FIG. 3;

FIG. 5 illustrates in greater details the connection between the recipient support and the machine body or frame shown in FIG. 4; and FIG. 6 illustrates the machine according to the invention with the machine body or frame and the recipient support shown in FIGS. 3 to 5.

DETAILED DESCRIPTION

FIGS. 1 to 6 illustrate an exemplary embodiment of a machine 1 according to the invention and parts thereof. In FIG. 6, machine 1 is in position for dispensing a beverage 2.

In such machine 1, beverage 2 may be prepared from a receptacle containing a beverage ingredient and/or from loose beverage ingredient (s).

Machine 1 has a beverage outlet 3 that is located above a dispensing area 4. Machine 1 includes a body or frame 5 having a first connecting part 51 and bearing beverage outlet 3. Machine 1 comprises a recipient a support 6 having a second connecting part 61 and support member 62 held, directly or indirectly, by second connecting part 61.

Second connecting part is disconnectably 61 connectable to first connecting part 51 so that support member 62 extends into dispensing area 4 to support a beverage user-recipient 7 under beverage outlet 3. First connecting part 51 and second connecting part 61 have a connection member and a connection receiver arrangement, e.g. a plug and socket arrangement, for disconnectably connecting parts 51, 61 such that: the first connecting part forms a connection member and the second connecting part forms a connection receiver; and/or first connecting part 51 forms a connection receiver and second connecting part 61 forms a connection member.

The connection member is inserted in the connection receiver when first and second connecting parts 51, 61 are connected (FIGS. 3 to 6). The connection member is removed from the connection receiver along a removal direction 51' when the first and second connecting parts 51, 61 are disconnected (FIGS. 1 and 4).

Removal direction has an upwardly directed 51' vertical component 51" when such machine is in position to dispense beverage 2 (FIGS. 4 and 5). Typically, in such a position, machine 1 is placed with a machine bottom 50 on an external generally horizontal support surface 8 (FIG. 6).

Upwardly directed vertical component 51" of removal direction 51' can be opposite to a vertical component of a force 71 exercised by user-recipient 7 on support member 62 when placed thereon under beverage outlet 3 (FIG. 4).

The connection member can be in the shape generally of a rod or a bar extending along removal direction 51' when and connecting parts 51, 61 first second are can a connected. The connection receiver have corresponding shape such that the connection member can be slid in an out of the receiver (FIGS. 1 to 4).

The connection receiver and/or the connection member can have a connection approaching extremity 51a, 61a, such as an insertion aperture 51a of the connection receiver or a free end 61a of the connection member, that allows for a mechanical positioning play between the connection member and the connection receiver when approaching each other at insertion (FIGS. 1, 2 and 5). Approaching extremity 51a, 61a may be tapered or flared, e.g. rounded or bevelled, to facilitate insertion of the connection member into the connection receiver (FIG. 5). The 51a may be receiver connection approaching extremity flared and the member connection approaching extremity 61a may be tapered (FIG. 5).

Connection approaching extremity 51a, 61a can be asymmetric to provide a mechanical positioning play only on an extremity play portion 51b, 61b generally opposite to an extremity urging portion 51c, 61c against which a main urging force 51''', 51'''' is exercised by first connecting part 51 on second connecting part 61 when second connecting part 61 is connected to first connecting part 51 (FIG. 5). First connecting part 51 may exercise a first main urging force 51''' at connection approaching extremity 61a and a second main urging force 51'''' at an extremity opposite thereto (FIG. 5).

The connection member and the connection receiver can be secured in a cantilever manner by gravity force of support member 62 when such machine 1 is in position to dispense beverage 2: a or the above free end 61a of the connection member in the connection receiver is urged down (see arrow 51''' in FIG. 5) by the connection receiver and a or the above insertion aperture 51a of the connection receiver urges up (see arrow 51'''' in FIG. 5) a or the extremity in the connection receiver of the connection member opposite free end 61a.

Free end 61a and the extremity of the connection member opposite free end 61a can be further urged by gravity force 71 of beverage user-recipient 7 placed on support member 62.

The connection receiver and/or the connection member may have a or the above connection approaching extremity 51a, 61a, such as a or the above insertion aperture 51a of the connection receiver or a or the above free end 61a of the connection member, that allows for a mechanical positioning play between the connection member and the connection receiver at insertion. For example, approaching extremity 51a, 61a is tapered or flared, e.g. rounded or bevelled, to facilitate insertion of the member connection into the connection receiver. For instance, the receiver connection approaching extremity 51a is flared and the member connection approaching extremity 61a is tapered.

In vertical cross-section extending along removal direction 51', connection the member within the connection receiver may have a convex shape and/or the connection receiver around the connection member may have a concave shape, the connection member and the connection receiver being for instance connectable together by a hook-free connection.

The connection member can have a shape extending all along within the connection receiver generally straight or arched along removal direction 51' when first and second connecting parts 51, 61 are connected. The connection receiver may have a corresponding shape.

The connection member and the connection receiver may cooperate along a plain or roller bearing interface to connect and disconnect the member and the receiver.

The connection member and the connection receiver may be clamped together when first and second parts 51, 61 are connected together.

Support member 62 may have a recipient placement surface 62' for placing recipient 7 thereon under beverage outlet 3. Removal direction 51' can be angled away upwardly from a horizontal direction by an angle α in a range of 5 to 80 deg. such as 10 to 60 deg., for instance 15 to 45 deg., e.g. 25 to 35 deg., when first and second connecting parts 51, 61 are connected and such machine 1 is in position to dispense beverage 2. See FIGS. 4 and 5.

Machine body or frame 5 can have a plurality of first connecting parts 51 that are vertically spaced apart for allowing recipient support 6 to be connected via its second connecting part 61 selectively at different corresponding heights under beverage outlet 3 (FIGS. 1 to 3).

For example, recipient support 6 has a drop collection arrangement 63 for collecting drops from support member 62. See FIG. 4.

Collecting arrangement form 63 may a liquid reservoir for accumulating drops or a drain channel for evacuating drops e.g. to a service unit of machine 1.

Collecting arrangement 63 can form a member that is separable from support member 62 or that is integral with the support member.

Collecting arrangement 63 may form a member that is integral with second connecting part 61.

Collecting arrangement 63 can be configured to collect drops draining via openings 62" of support member 62.

Machine 1 may include one or more of: a control unit, such as a unit comprising a user-interface, for controlling active machine parts; an ingredient supply arrangement, such as a liquid source, e.g. a water tank 10 and/or a connector to a water supply line; a waste material collector 11, such as a waste ingredient collector and/or a waste ingredient receptacle collector; a fluid circuit, such as a circuit for guiding a fluid, e.g. water, from a liquid source 10 to the beverage outlet 3.

Such fluid circuit may incorporate a thermal conditioner, e.g. a heater and/or a cooler. Fluid circuit may include a pump, e.g. a solenoid pump or a membrane pump or a peristaltic pump, such as a low pressure pump e.g. operating within a range of 1 to 5 bar, such as 1.5 to 3 bar.

Such fluid circuit may include an ingredient mixing unit 12 for producing beverage 2 and delivering such beverage 2 to beverage outlet 3. For example, mixing unit 12 is configured for mixing liquid from source 10 with a flavouring ingredient, e.g. a flavouring ingredient supplied within a or the above receptacle into mixing unit 12. Mixing unit 12 may be arranged for mixing the liquid with the flavouring ingredient by rotational forces, e.g. by rotating mixing unit 12 when containing the liquid and the flavouring ingredient.

The invention claimed is:

1. A machine for dispensing a beverage, the machine comprising:
    a beverage outlet located above a dispensing area;
    a machine body having a first connecting part and bearing the beverage outlet; and
    a recipient support having a second connecting part and a support member, wherein the second connecting part is configured to hold, directly or indirectly, the support member,
    the second connecting part configured to disconnectably connect to the first connecting part so that the support member extends into the dispensing area and is configured to support a beverage user-recipient under the beverage outlet, the first connecting part and the second connecting part having a connection member and a connection receiver arrangement configured for disconnectably connecting the first connecting part and the second connecting part such that:
        the first connecting part comprises a connection member and the second connecting part comprises a connection receiver; and/or
        the first connecting part comprises a connection receiver and the second connecting part comprises a connection member,
    the connection member configured to be inserted in the connection receiver when the first connecting part and the second connecting part are connected, the connection member configured to be removed from the connection receiver along a removal direction when the first connecting part and the second connecting part are disconnected,
    the removal direction having an upwardly directed vertical component when the machine is in position to dispense the beverage, and
    wherein, by gravity force of the support member when the machine is in the position to dispense the beverage, a free end of the connection member in the connection receiver is urged down by the connection receiver and an insertion aperture of the connection receiver is urged up, whereby the connection member and the connection receiver are secured in a cantilever manner.

2. The machine of claim 1, wherein the upwardly directed vertical component of the removal direction is opposite to a vertical component of a force exercised by the user-recipient on the support member when placed under the beverage outlet.

3. The machine of claim 1, wherein:
    the connection member extends along the removal direction when the first connecting part and the second connecting part are connected; and
    the connection receiver has a shape corresponding to a shape of the connection member such that the connection member can be slid in and out of the connection receiver.

4. The machine of claim 1, wherein one of the connection receiver or the connection member has a connection approaching extremity configured to allow for a mechanical positioning play between the connection member and the connection receiver when approaching each other at insertion.

5. The machine of claim 4, wherein the connection approaching extremity is asymmetric to provide a mechanical positioning play only on an extremity play portion generally opposite to an extremity urging portion against which a main urging force is exercised by the first connecting part on the second connecting part when the second connecting part is connected to the first connecting part.

6. The machine of claim 1, wherein the free end and an extremity of the connection member opposite the free end are further urged by gravity force of the beverage user-recipient placed on the support member.

7. The machine of claim 3, wherein one of the connection receiver or the connection member has a connection approaching extremity configured to allow for a mechanical positioning play between the connection member and the connection receiver at insertion.

8. The machine of claim 1, wherein, in vertical cross-section extending along the removal direction, the connection member within the connection receiver has a convex shape and/or the connection receiver around the connection member has a concave shape.

9. The machine of claim 1, wherein the connection member has a shape extending within the connection receiver that is generally straight or arched along the removal direction when the first connecting part and the second connecting part are connected.

10. The machine of claim 1, wherein the connection member and the connection receiver:
cooperate along a plain or roller bearing interface to connect and disconnect the connection member and the connection receiver; and/or
are clamped together when the first connecting part and the second connecting part are connected together.

11. The machine of claim 1, wherein the support member has a recipient placement surface configured for placing the recipient thereon under the beverage outlet and wherein the removal direction is angled away upwardly from a horizontal direction by an angle in a range of 5 to 80 deg., when the first connecting part and the second connecting part are connected and the machine is in the position to dispense the beverage.

12. The machine of claim 1, wherein the machine body has a plurality of first connecting parts that are vertically spaced apart for allowing the recipient support to be connected selectively at different corresponding heights under the beverage outlet.

13. The machine of claim 1, wherein the recipient support has a drop collection arrangement configured for collecting drops from the support member.

14. The machine of claim 1, further comprising:
a control unit configured for controlling active machine parts;
an ingredient supply arrangement;
a waste material collector; and
a fluid circuit.

15. The machine of claim 1, wherein the position to dispense the beverage comprises a machine bottom on an external generally horizontal support surface.

16. The machine of claim 8, wherein the connection member and the connection receiver are configured to connect through a hook-free connection.

17. The machine of claim 9, wherein the connection receiver has a shape corresponding to the shape of the connection member.

* * * * *